(12) United States Patent
Valls et al.

(10) Patent No.: US 7,655,712 B2
(45) Date of Patent: Feb. 2, 2010

(54) BITUMINOUS COMPOSITION AND METHOD

(75) Inventors: Ramon Valls, Barcelona (ES); Joaquin Bigorra Llosas, Sabadell (ES); Javier Raya, Sant Vicenc dels Horts (ES)

(73) Assignee: Cognis IP Management GmbH, Duesseldorf (DE)

( * ) Notice: Subject to any disclaimer, the term of this patent is extended or adjusted under 35 U.S.C. 154(b) by 13 days.

(21) Appl. No.: 12/029,052

(22) Filed: Feb. 11, 2008

(65) Prior Publication Data
US 2008/0207802 A1   Aug. 28, 2008

(30) Foreign Application Priority Data
Feb. 12, 2007   (EP) ................... 07002914

(51) Int. Cl.
*C08L 95/00* (2006.01)
(52) U.S. Cl. .......................................... 524/60; 524/59
(58) Field of Classification Search ................... 524/59, 524/60, 68, 71; 106/273.1, 275, 277, 281.1, 106/283, 284.03, 284.06
See application file for complete search history.

(56) References Cited

U.S. PATENT DOCUMENTS 2,737,509 A    3/1956   Jelling
3,475,395 A *  10/1969  Hsieh ........................... 528/393
3,597,407 A *  8/1971   Hsieh ........................... 526/141
6,156,113 A    12/2000  Pasquier

FOREIGN PATENT DOCUMENTS

FR          2 768 150 A1   3/1999

* cited by examiner

*Primary Examiner*—Peter Szekely

(57) ABSTRACT

A binder for bituminous compositions including at least one dialkylamide derived from an unsaturated fatty acid; and at least one catalyst for polymerizing the at least one dialkylamide under the action of oxygen is provided. A bituminous composition including (i) 80% b.w. to 94.9% b.w. bitumen; and (ii) a binder, that includes (a) 1% b.w. to 19% b.w. unsaturated fatty acid dialkylamides; and (b) 0.1% b.w. to 1% b.w. of a polymerization catalyst, where the amounts are calculated based on the solids content of the composition, and where the amounts total 100% b.w. is also provided. A method for preparing a binder for a bituminous composition including combining at least one unsaturated dialkylamide derived from an unsaturated fatty acid with at least one catalyst for the polymerization of the at least one dialkylamide under the action of oxygen is also provided.

6 Claims, No Drawings

BITUMINOUS COMPOSITION AND METHOD

CROSS-REFERENCE TO RELATED APPLICATIONS

This application claims priority under 35 U.S.C. § 119 from European Patent Application No. 07002914.5, filed Feb. 12, 2007, the entire disclosure of which is hereby incorporated by reference herein.

BACKGROUND OF THE INVENTION

1. Field of the Invention

The present invention relates to bituminous compositions and methods, and more specifically, relates to binders and methods for making the binders for bituminous compositions.

2. Background Information

Bituminous binders are used, particularly in the road construction industry, to provide bonding between aggregates or between a substrate and aggregates. The various possible uses are distinguishable by the following:

(i) The bituminous binder is hot-mixed with aggregates, and the resulting product is described as a hot bituminous mix. The bituminous binder provides the bonding between the aggregates.

(ii) The bituminous binder is hot-spread over a substrate, and the aggregates are spread over the bituminous layer which provides adhesion to the substrate. The resulting product is described as an anhydrous binder surfacing.

(iii) The bituminous binder is cold-mixed with aggregates and the resulting product is described as a cold bituminous mix produced with an aqueous bituminous product emulsion.

(iv) The bituminous binder is cold-spread, and the resulting product is described as a surfacing produced with an aqueous bituminous binder emulsion.

When the mixes are prepared, or the spreading operations are carried out, it is always necessary for the consistency of the binder to be such that it allows good wetting of the aggregates, and for the consistency of the binder subsequently to change in order for the bituminous mixes or the surfacings thus produced to acquire mechanical performances which render them suitable for road construction use. A more fluid initial consistency of the binder is obtained either by heating the bituminous binder, or by thinning or fluxing (the two terms denote the same operation, the choice of one or the other usually being a function of the nature of the additive), by introducing a solvent or fluxing oil of petroleum or carbon chemistry origin, or by aqueous emulsification of the bituminous binder, or a combination of the above methods.

The solvents currently used are of petroleum or carbon chemistry origin. After the application of the binder, the solvents evaporate in order to allow the binder to recover its high consistency. The solvents, which are gradually dispersed into the atmosphere, pollute the atmosphere, contaminate aerobic organisms, and contribute to the greenhouse effect. Furthermore, the solvents generally comprise polycyclic aromatic compounds, at least some of which are recognized as mutagenic. The use of these solvents contributes to the exhaustion of fossil fuel resources. The presence of the above-mentioned solvents also poses safety problems, because they greatly lower the ignition point and require strict measures for protection against fire on storage and during transportation. French patent application FR 2768150 A1 (Saada) suggests using unsaturated fatty acid methyl esters as thinner components. These compounds, however, have been found to exhibit unsatisfying rheological behavior during the curing process.

The aim of the invention is to overcome all or part of the above disadvantages, without affecting the road construction performance of the bituminous binder or the conditions of use.

SUMMARY OF THE INVENTION

Briefly described, according to an aspect of the invention, a binder for bituminous compositions includes (a) at least one dialkylamide derived from an unsaturated fatty acid; and (b) at least one catalyst for polymerizing the at least one dialkylamide under the action of oxygen.

According to another aspect of the invention, a bituminous composition includes (i) 80% b.w. to 94.9% b.w. bitumen; and (ii) a binder, that includes (a) 1% b.w. to 19% b.w. unsaturated fatty acid dialkylamides; and (b) 0.1% b.w. to 1% b.w. of a polymerization catalyst, wherein the amounts are calculated based on the solids content of the composition, and wherein the amounts total 100% b.w.

According to another aspect of the invention, a method for preparing a binder for a bituminous composition includes combining at least one unsaturated dialkylamide derived from an unsaturated fatty acid with at least one catalyst for the polymerization of the at least one dialkylamide under the action of oxygen.

DETAILED DESCRIPTION OF THE INVENTION

The present invention relates to bituminous compositions for road construction, comprising as binders:

(a) at least one thinner selected from the group consisting of dialkylamides derived from unsaturated fatty acids and being capable to be chemically converted on contact with air, after the binder has been spread, and (b) at least one catalyst for the polymerization of the thinner under the action of oxygen.

Surprisingly, it has been observed that unsaturated fatty acid dialkylamides show superior properties, especially with respect to the so-called "ring-and-ball softening temperature" when compared, for example, with unsaturated fatty acid methyl esters, which are known in the art as being suitable for the same purpose. In addition, unsaturated fatty acid dialkylamides are environmentally safe and do not represent volatile organic compounds (VOCs), since they are incorporated into the bituminous mass in the course of the curing.

Unsaturated Dialkylamides

The unsaturated dialkylamides forming the thinner component according to the present invention correspond to the general formula (I), $$R^1CO-NR^2R^3 \qquad (I)$$

in which $R^1CO$ represents an acyl radical having 16 to 22 carbon atoms and 1 to 3 double bonds, and $R^2$ and $R^3$ independently represent an alkyl or an hydroxy alkyl group having 1 to 4 carbon atoms. Typical examples are the dialkylamides based on the unsaturated fatty acids as described in the above section. However, preferred dialkylamides are derived from oleic acid, sunflower acid, soy acid or tall oil fatty acid. In a second preferred embodiment of the present invention, the unsaturated dialkylamides represent dimethylamides. Finally, the most preferred reactive solvents are dimethylamides derived from oleic acid or tall oil.

Polymerization Catalysts

In the absence of evaporation of solvents, the increase in consistency of the binder after spreading involves chemical reactions in the presence of atmospheric oxygen. These reactions, catalyzed by known methods with metal salts, comprise the formation of peroxide bridges on the unsaturated chains of the fatty acids moieties. These bridges are unstable and result in the formation of free radicals, which attack other chains, producing by propagation a polymerization-cross-linking of the dialkylamides. Suitable polymerization catalysts encompass carboxylates and naphthenates of alkaline earth or transition metals such as, for example, octanoates and/or naphthenates of calcium, barium, zinc or cobalt.

Compositions

In a preferred embodiment, the compositions according to the invention comprise
(i) about 80% b.w. to about 94.9% b.w., preferably about 85% b.w. to about 95% b.w., bitumen,
(ii) about 1% b.w. to about 19% b.w., preferably about 5% b.w. to about 15% b.w., unsaturated fatty acid dialkylamides, and
(iii) about 0.1% b.w. to about 1% b.w., preferably 0.2% b.w. to 0.5% b.w., polymerization catalysts, the amounts being calculated on the solids amount of the compositions and on the condition that the amounts add to 100% b.w. Usually, the compositions consist of a bituminous and an aqueous phase, the aqueous phase representing about 0.1% b.w. to about 20% b.w., and preferably between 1% b.w. and 15% b.w. of the total composition. Preferably, the binders are present in the aqueous phase of the composition, and the compositions represent emulsions or dispersions.

INDUSTRIAL APPLICATION

Another object of the present invention relates to the use of unsaturated dialkylamides, and more particularly, oleic acid dimethylamide, as curable thinners for the production of bituminous compositions for road construction. The dialkylamides may be present in amounts of about 5% b.w. to about 20% b.w., and preferably about 7% b.w. to about 15% b.w., the amounts calculated on the total aqueous or non-aqueous composition.

EXAMPLES

Example 1

Comparative Examples C1 and C2

Samples of comparative binders, C1 and C2, and a binder according to the invention, all showing an initial viscosity of approximately 110 s, measured at 40° C. according to NF Standard T66-005, were spread as 1 mm layers and were stored at a temperature of 10 or 20° C. The ring-and-ball softening point was measured according to French Standard NF T66-008, for each layer, after 3, 7, 14 and 31 days. The results are given in Table 1.

TABLE 1

Ring-and-ball softening points

| Composition | C1 | C2 | 1 |
|---|---|---|---|
| Bitumen 180/220 | 91.0 | 91.0 | 91 |
| Oleic acid methyl ester | — | 8.8 | — |
| Oleic acid dimethylamide | — | — | 8.8 |
| Cobalt octanoate | — | 0.2 | 0.2 |
| BP-Flux[1] | 9.0 | — | — |
| Ring-and-ball softening point [° C.] | | | |
| 10° C., 3 d | 25.0 | 18.5 | 20.5 |
| 10° C., 7 d | 20.0 | 22.0 | 25.0 |
| 10° C., 14 d | 29.1 | 24.0 | 26.0 |
| 10° C., 31 d | 33.0 | 24.5 | 27.0 |
| 20° C., 3 d | 27.5 | 21.0 | 23.0 |
| 20° C., 7 d | 31.0 | 22.5 | 26.5 |
| 20° C., 14 d | 33.5 | 26.5 | 29.5 |
| 20° C., 31 d | 37.5 | 28.0 | 31.5 |

[1]BP-Flux is the trade name of a fluxing oil sold by the company BP, which oil is a mixture of polynuclear aromatic solvents obtained as by-product of refinery cracking.

As one can see, the compositions according to the present invention exhibit superior hardening properties compared to similar compositions based on unsaturated fatty acid methyl esters, and show an evolution similar to a classic composition (C1).

What is claimed is:

1. A bituminous composition, comprising:
   (i) 80% b.w. to 94.9% b.w. bitumen; and
   (ii) a binder, comprising:
      (a) 1% b.w. to 19% b.w. unsaturated fatty acid dialkylamides; and
      (b) 0.1% b.w. to 1% b.w. of a polymerization catalyst,
   wherein the amounts are calculated based on the solids content of the composition, and wherein the amounts total 100% b.w.

2. The composition according to claim 1, wherein the composition includes a bituminous phase and an aqueous phase, the aqueous phase representing 0.1% b.w. to 20% b.w. of the total composition.

3. The composition according to claim 2, wherein the binder is present in the aqueous phase of the composition.

4. The composition according to claim 1, wherein the composition is in the form of an emulsion or a dispersion.

5. A method for preparing a binder for a bituminous composition, comprising combining at least one unsaturated dialkylamide derived from an unsaturated fatty acid with at least one catalyst for the polymerization of the at least one dialkylamide under the action of oxygen.

6. The method according to claim 5, wherein the at least one unsaturated dialkylamide is present in amounts of 5% b.w. to 20% b.w., based on the total weight of the composition.

* * * * *